(12) United States Patent
Nielsen et al.

(10) Patent No.: US 10,623,787 B1
(45) Date of Patent: Apr. 14, 2020

(54) OPTIMIZING ADAPTIVE BIT RATE STREAMING FOR CONTENT DELIVERY

(71) Applicant: Amazon Technologies, Inc., Seattle, WA (US)

(72) Inventors: Olaf Nielsen, Portland, OR (US); Lionel Bringuier, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 163 days.

(21) Appl. No.: 15/801,271

(22) Filed: Nov. 1, 2017

(51) Int. Cl.
*H04N 21/2365* (2011.01)
*H04N 21/2662* (2011.01)
*H04N 21/236* (2011.01)
*H04N 21/81* (2011.01)
*G06F 16/957* (2019.01)

(52) U.S. Cl.
CPC ... *H04N 21/23611* (2013.01); *G06F 16/9574* (2019.01); *H04N 21/23655* (2013.01); *H04N 21/2662* (2013.01); *H04N 21/8173* (2013.01)

(58) Field of Classification Search
CPC .............. H04N 21/23611; G06F 16/9574
See application file for complete search history.

(56) References Cited

U.S. PATENT DOCUMENTS

| | | | | |
|---|---|---|---|---|
| 6,389,473 B1* | 5/2002 | Carmel | .............. | H04L 29/06 709/231 |
| 7,802,286 B2* | 9/2010 | Brooks | .............. | H04N 21/23439 725/101 |
| 8,204,085 B1* | 6/2012 | Courtney | .............. | H04J 3/0623 370/395.51 |
| 8,539,526 B1* | 9/2013 | Hundemer | .............. | H04H 20/10 725/36 |
| 8,627,388 B2* | 1/2014 | Wood | .............. | H04N 21/25808 709/231 |
| 8,812,670 B2* | 8/2014 | Haddad | .............. | H04L 12/2834 709/225 |
| 9,137,578 B2* | 9/2015 | Garner | .............. | H04N 21/482 |
| 9,203,694 B2* | 12/2015 | Rajamani | .............. | H04L 67/16 |
| 9,491,498 B2* | 11/2016 | Brooks | .............. | H04N 21/23439 |
| 9,794,562 B2* | 10/2017 | Gregotski | .............. | H04N 21/64715 |
| 10,033,804 B2* | 7/2018 | Schapira | .............. | H04L 67/2804 |
| 10,038,759 B2* | 7/2018 | Lee | .............. | H04L 41/12 |
| 10,244,265 B2* | 3/2019 | Norkin | .............. | H04N 19/117 |
| 10,310,928 B1* | 6/2019 | Hegar | .............. | G06F 11/16 |
| 2006/0171414 A1* | 8/2006 | Katibian | .............. | H04L 47/10 370/468 |
| 2007/0223380 A1* | 9/2007 | Gilbert | .............. | H04L 45/24 370/235 |

(Continued)

*Primary Examiner* — Irfan Habib
(74) *Attorney, Agent, or Firm* — Knobbe, Martens, Olson & Bear, LLP

(57) ABSTRACT

A content streaming system and methodology for facilitating the dynamic management of adaptive bitrate streaming bundles in content streaming. The dynamic management of the adaptive bitrate streaming bundles can include the utilization of an efficiency matrix that associates meta-data associated with the delivery of content streaming data with available bitrate encodings or bitrate/format combinations. The content streaming system can then dynamically manage bitrate manifests to dynamically change encoding bitrates or bitrate/format combinations offered to clients based on network conditions, client attributes, content attributes, and the like.

18 Claims, 8 Drawing Sheets

(56) References Cited

U.S. PATENT DOCUMENTS

| | | | |
|---|---|---|---|
| 2008/0192820 A1* | 8/2008 | Brooks | H04N 7/17318 375/240.02 |
| 2008/0273591 A1* | 11/2008 | Brooks | H04N 7/1675 375/240.01 |
| 2009/0028182 A1* | 1/2009 | Brooks | H04L 41/0896 370/466 |
| 2011/0258163 A1* | 10/2011 | Volkoff | G06F 16/113 707/661 |
| 2013/0156094 A1* | 6/2013 | Syed | H04N 21/23424 375/240.02 |
| 2013/0262694 A1* | 10/2013 | Swaminathan | H04L 65/4084 709/231 |
| 2014/0328205 A1* | 11/2014 | Schrecke | H04L 43/0894 370/253 |
| 2015/0127845 A1* | 5/2015 | Phillips | H04L 65/601 709/231 |
| 2016/0337675 A1* | 11/2016 | Mutton | H04N 19/40 |
| 2017/0012906 A1* | 1/2017 | Szilagyi | H04L 49/9005 |
| 2017/0055089 A1* | 2/2017 | Pedersen | H04R 25/554 |
| 2017/0189641 A1* | 7/2017 | Moturu | A61B 5/0022 |

\* cited by examiner

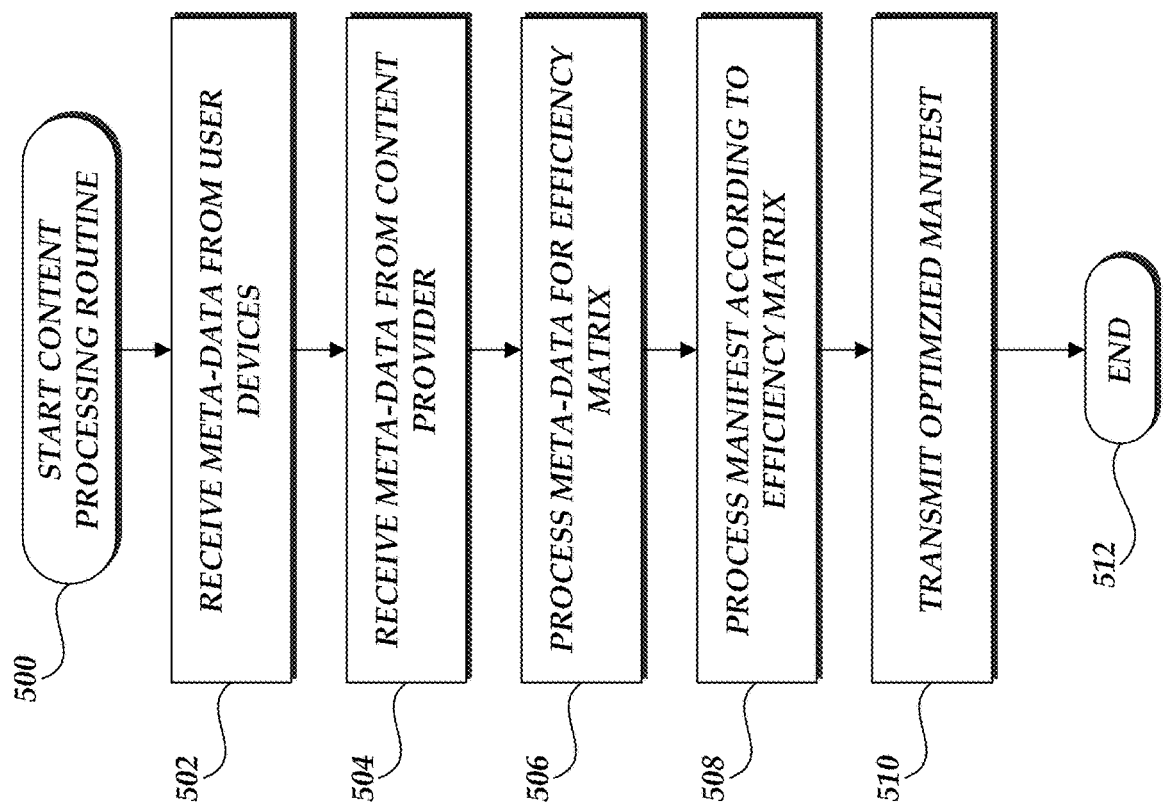

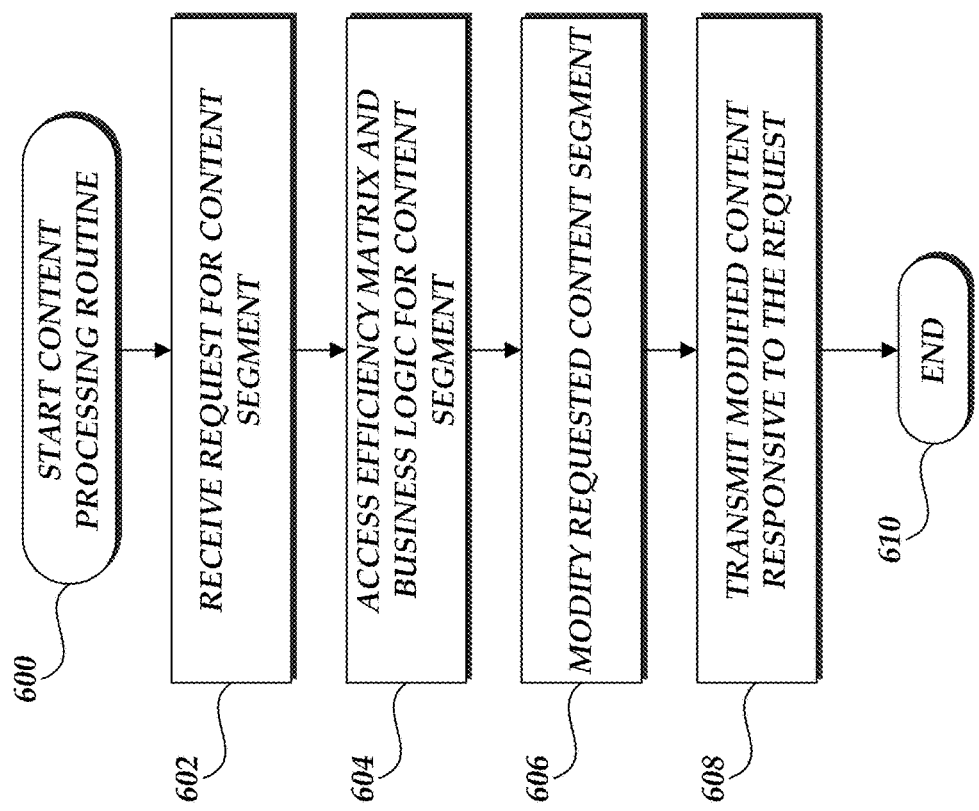

OPTIMIZING ADAPTIVE BIT RATE
STREAMING FOR CONTENT DELIVERY

BACKGROUND

Generally described, computing devices and communication networks can be utilized to exchange information. In a common application, a computing device can request content from another computing device via the communication network. For example, a user at a personal computing device can utilize a browser application to request a content page (e.g., a network page, a Web page, etc.) from a server computing device via a network (e.g., the Internet). In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content through the utilization of a content delivery network ("CDN") service provider. As with content providers, CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 5 is a flow diagram illustrative of a content processing routine implemented by a video packaging system; and FIG. 6 is a flow diagram illustrative of a content processing routine implemented by a video packaging system.

DETAILED DESCRIPTION

Figure 1:
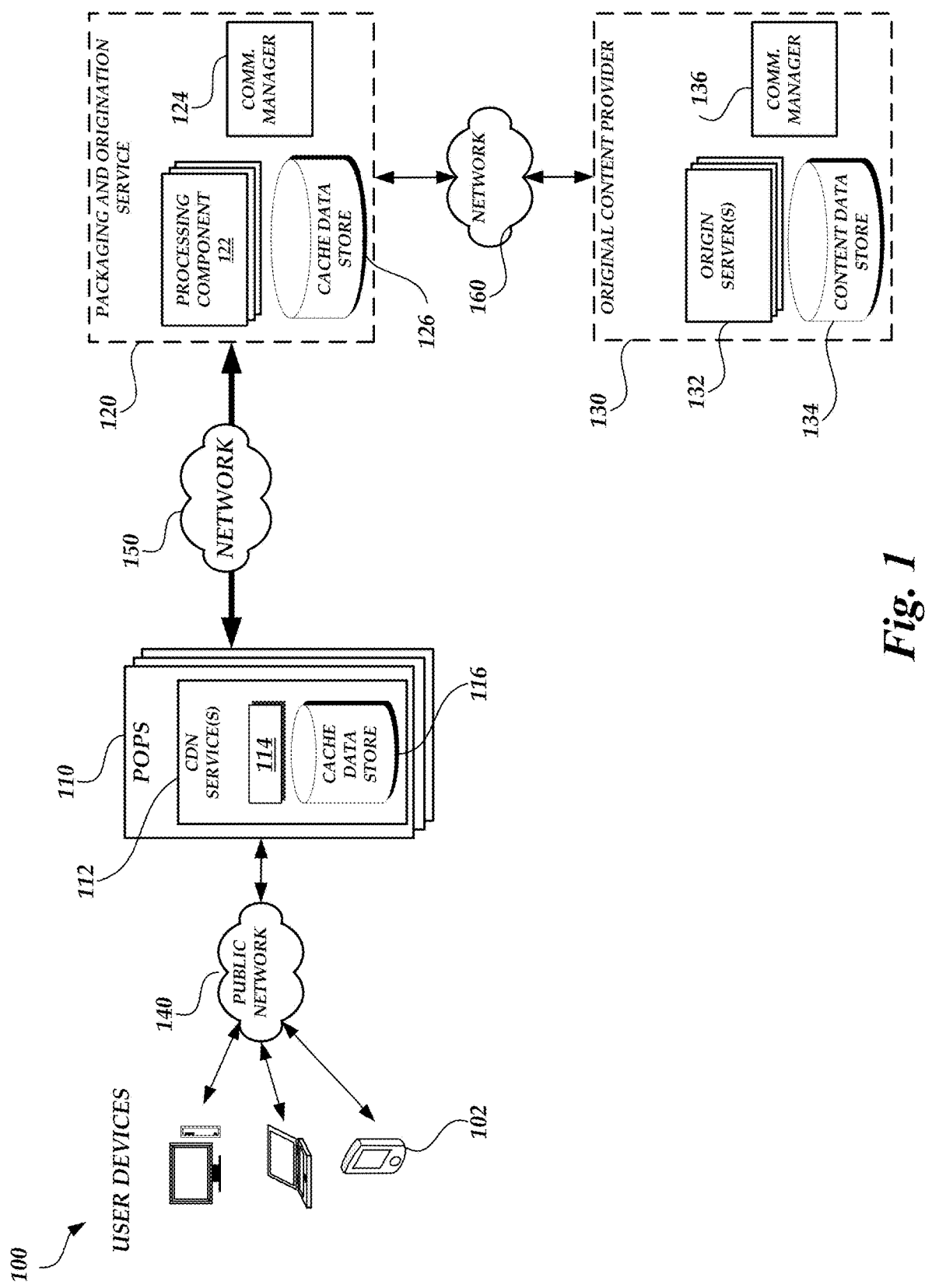
FIG. 1 is a block diagram of a communication management environment that includes one or more client devices, one or more user devices, and a video packaging system according to one embodiment.

Generally described, content providers can provide content to requesting users. In some embodiments, the content providers can utilize or incorporate content delivery network ("CDN") service providers to deliver content to clients with increased efficiency or less latency. With regard to video content, a content provider can implement a video packaging and origination service that is able to deliver video content to requesting users. In accordance with an illustrative embodiment, the CDN or other content delivery component can deliver video content to requesting users or client computing devices utilizing streaming transmissions in accordance with one of a range of communication protocols, such as the hypertext transfer protocol ("HTTP").

In certain embodiments, communication network bandwidth may be limited or constrained to deliver content, such as communication networks including delivery of content to mobile devices. In one aspect, content providers can organize requested content, such as a video file, into multiple segments that are then transmitted to requesting devices segment by segment. For example, in a video stream, each segmented portion typically accounts for 2-10 seconds of video rendered on a receiving device.

Each video segment can be encoded according to a defined bitrate and format, which generally defines the number of bits of data that are encoded over a measured amount of time and the specific software algorithm and resulting content representation format utilized to encode the data for transmission. For video files, bitrates are typically measured according to how many kilobits or megabits of data over a second of time. By way of example, a data file that corresponds to 1 megabyte of video data encoded in one second would be considered to have an encoding bitrate of 8 mbps (e.g., 8 megabits per second) while a lower definition video file that corresponds to 45 kilobytes of video data processed in one second would be considered to have an encoding bitrate of 360 kbps (e.g., 306 kilobits per second). In some basic implementations, a client computing device can simply request content having a fixed encoding rate or have a fixed encoding rate selected in response to a streaming content request. Such a fixed encoding rate approach can be deficient in facilitating variance of the encoding bitrate (both positive and negative) based on factors, such as network bandwidth, client computing device utilization, quality demands, and the like. In addition to the association of the encoding bitrate, video segments can be further defined by associating the encoding bitrate with the encoding format utilized by the encoder to generate the output stream. The encoding format can correspond to a content representation format for storage or transmission of video content (such as in a data file or bitstream). Examples of encoding formats include but not limited to the motion pictures expert group ("MPEG) MPEG-2 Part 2, MPEG-4 Part 2, H.264 (MPEG-4 Part 10), high efficiency video coding ("HEVC"), Theora, RealVideo RV40, VP9, and AOMedia Video 1 ("AV1"), and the like.

In some embodiments, it may be possible for the content provider to facilitate variable bit rate encoding to enable for variances in the encoding bitrates of individual segments of a video file. In such embodiments, the content provider can generate multiple encoded bitrate versions or combinations of encoded bitrates and formats of individual video file segments. The content provider can then make at least a subset of the multiple bitrate encoded versions available to clients responsive to a request for a particular encoded bitrate version and format. Generally, a content provider can generate a catalog identifying the video segments and encoded bitrates for each identified video segment. The catalog can be written into a manifest file that is provided to individual client computing devices that have requested the video file. Thereafter, each client computing devices, through a respective software application, can request individual video segments according to the available encoded bitrates and formats as published in the manifest file.

By way of illustrative example, a client computing device may request the first video segment at a lower or default bitrate or at the lowest available bitrate. For ease of discussion, the encoding format may also be requested with the encoding bitrate or the encoding format may be pre-defined. With continued reference to the illustrative example, if the requested segments are received and the software application determines that a download speed exceeds the requested bitrate of the received segment, the next requested segment can be requested at a higher bitrate. The process can continue until the software application reaches a maximum bitrate (e.g., due to financial considerations or other controls) or until the requested bitrate matches the available download bandwidth. Still further, if during the transmission of the video file, the bandwidth conditions change, the software application can request a different encoding bitrate based on the changed conditions.

While adaptive bit rate streaming implementations facilitate streaming content delivery experiencing variable bandwidth scenarios, such implementations typically involve a fixed bundle of bitrate encoding for each segment in a video file. Such approaches utilizing fixed bundles of bitrate encoding are not optimized for individual varying bandwidth scenarios or varying scenarios related to different devices. Rather, these approaches can be considered to implement a typical one size fits all approach in selecting which encoding bitrates (or bitrates and format combinations) are included in the bundle of bitrate encoding. For example, a fixed manifest will likely include a large range of encoding bitrates to facilitate low bandwidth connections (e.g., mobile devices) and high bandwidth connections (e.g., optimized computing devices with a direct network connection). For lower bandwidth connected devices, the number of different encoding bitrates for a given encoding format that are able to be requested can be more limited as the higher encoding rates would likely never be achievable. Accordingly, in some scenarios, especially related to mobile device content streaming, the need for dynamically modifying the encoding bitrates identified in data file manifests can further facilitate the content streaming services.

Aspects of the present application correspond to a content streaming system and methodology for facilitating the dynamic management of adaptive bitrate streaming bundles in content streaming. The dynamic management of the adaptive bitrate streaming bundles can include the utilization of an efficiency matrix that associates meta-data associated with the delivery of content streaming data with available bitrate encodings and encoding formats. The content streaming system can then dynamically manage bitrate manifests to dynamically change encoding bitrates or encoding bitrates and formats offered to clients based on network conditions, client attributes, content attributes, and the like.

Illustratively, individual client computing devices, via a software application or agent, collect information regarding the receipt and processing of requested segments of video data. Such collected information can be generally referred to as metric information and can be passed to the content streaming system in form of meta-data. The meta-data can include, but is not limited to, the throughput or number of segments were received over a defined period of time (e.g., x seconds), the bitrate for each received segment, the requested format, error rates or re-request rates, bitrates that were identified in a bundle/manifest but not requested, formats that were identified in a bundle/manifest but not requested .and the like. The information collected by the client computing device may be directly correlated. to the specific file being requested and streamed. The collected information may be transmitted to the content streaming system in real-time, based on a periodic interval, or based on a request for information or other triggering event.

After receiving the meta-data, the content streaming system generates or updates an efficiency matrix that correlates the received metric information in the meta-data with the different encoding bitrates or bitrate/format combinations. Illustratively, the content streaming system can utilize the efficiency matrix to log metrics about individual encoding bitrates or bitrate/format combinations. For individual client computing devices or sets of client computing devices, the content streaming system can then identify various trends or characteristics related to the currently offered bundle of encoding bitrates or bitrate/format combinations. For example, the content streaming system can identify encoding bitrates or bitrate/format combinations that have not been requested or in which the number of requests fall below a minimum threshold. Additionally, the content streaming system can identify opportunities for additional encoding bitrates or bitrate/format combinations by identifying encoding bitrates or bitrate/format combinations that have been requested a number of times above the minimum threshold and determining whether additional encoding bitrates between the identified encoding bitrates are possible and available. Using the efficiency matrix, the content streaming system can optimize the manifest or encoding bitrate bundle that is made available to the client computing device for subsequent segment requests.

In addition to the efficiency matrix, in another embodiment, the content streaming system can receive utilize information characterizing the content segments to select encoding bitrates or bitrate/format combinations to be included in a bundle/manifest or to process requests for encoding bitrates. Illustratively, the information characterizing the content segments can include quality designations that can specify a minimal level of encoding bitrate or bitrate/format combinations for the segments associated with the characterization. The content streaming system can then be configured with business logic or other rules that dictate or influence how bitrates are provided to the client computing devices or how requests for a "higher" or "lower" encoding bitrates are received and processed. For example, content designated as a higher quality content may require a higher encoding bitrate or specific encoding format combinations than content designated as a lower quality content even though the efficiency matrix may identify similar performance metrics. Although quality is represented as an illustrative characterization, other characterizations may also be included. Additionally, for purposes of the present application reference to examples related to selecting various encoding bitrates for segments will be equally applicable to selecting encoding bitrate in combination with an encoding format regardless of whether the specific examples reference such a combination or only refers to encoding bitrate.

FIG. 1 illustrates a general content delivery environment 100 for delivering content from original content providers to user devices. The content delivery environment 100 includes a plurality of devices 102 utilized by individual users, generally referred to a client computing devices, to request streaming content from a video packaging and origination service 120. Illustratively, the video packaging and origination service 120 indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), and the like. Based on consumer demand, a video packaging and origination service can also provide advanced video transmission features such as just-in-time packaging of video content, digital rights management ("DRM") encryption, time-shifting, bitrate selection, catch up TV, and more. The content can be illustratively provided by one or more origin sources, such as original content provider 130.

Client computing devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant (PDA), hybrid PDA/mobile phone, mobile phone, electronic book reader, set-top box, camera, appliance, controller, digital media player, and the like. Each client computing device 102 may optionally include one or more data stores (not shown in FIG. 1) including various applications or computer-executable instructions, such as web browsers, used to implement the embodiments disclosed herein. On an individual basis, client computing devices 102 may generally have access to fewer computing resources (e.g., processing power, memory, persistent storage space, electronic power, network communication capabilities, input and output capabilities, etc.) than the user computing devices 104 and job management system 110. Illustrative components of a client computing device 102 will be described with regard to FIG. 2.

In some embodiments, a CDN service provider 110 may include multiple edge locations from which a user device can retrieve content. Individual edge location 112 may be referred to herein as a point of presence ("POP"), where a POP is intended to refer to any collection of related computing devices utilized to implement functionality on behalf of one or many providers. POPs are generally associated with a specific geographic location in which the computing devices implementing the POP are located, or with a region serviced by the POP. As illustrated in FIG. 1, the POP 112 can include one or metric information processing component 114 for processing metric information provided by client computing devices 102 and a data store 116 for maintain collected metric information. For example, a data center or a collection of computing devices within a data center may form a POP. In some instances, the POPs may implement one or more services, such as CDN services, data storage services, data processing services, etc. The CDN service provider 110 may include multiple POPs located in different geographic locations so that user devices can communicate with a nearby a POP to retrieve content, thereby reducing the latency of delivering requested content.

Networks 140, 150, 160 may be any wired network, wireless network, or combination thereof In addition, the networks 140, 150, 160 may be a personal area network, local area network, wide area network, cable network, satellite network, cellular telephone network, or combination thereof. In the example environment of FIG. 1, network 140 is a global area network (GAN), such as the Internet. Protocols and components for communicating via the other aforementioned types of communication networks are well known to those skilled in the art of computer communications and thus, need not be described in more detail herein. While each of the client computing devices 102 and video packaging and origination service 110 are depicted as having a single connection to the network 130, individual components of the client computing devices 102 and video packaging and origination service 110 may be connected to the network 130 at disparate points. Accordingly, communication times and capabilities may vary between the components of FIG. 1. Likewise, although FIG. 1 is illustrated as having three separate networks 140, 150, 160, one skilled in the relevant art will appreciate that the video packaging and origination service 110 may utilize any number of networks.

In accordance with embodiments, the video packaging and origination service 120 includes one or more servers for receiving content from original content providers 130 and processing the content to generate a set of encoded bitrate segments. As described in further detail below, the video packaging and origination service 120 can receive processed metric information from the metric processing component 114 and utilize an efficiency matrix in the selection of encoded bitrate segment bundles.

It will be appreciated by those skilled in the art that the job management system 110 may have fewer or greater components than are illustrated in FIG. 1. Thus, the depiction of the video packaging and origination service 120 in FIG. 1 should be taken as illustrative. For example, in some embodiments, components of the video packaging and origination service 120 may be executed by one more virtual machines implemented in a hosted computing environment. A hosted computing environment may include one or more rapidly provisioned and released computing resources, which computing resources may include computing, networking or storage devices.

Figure 2:
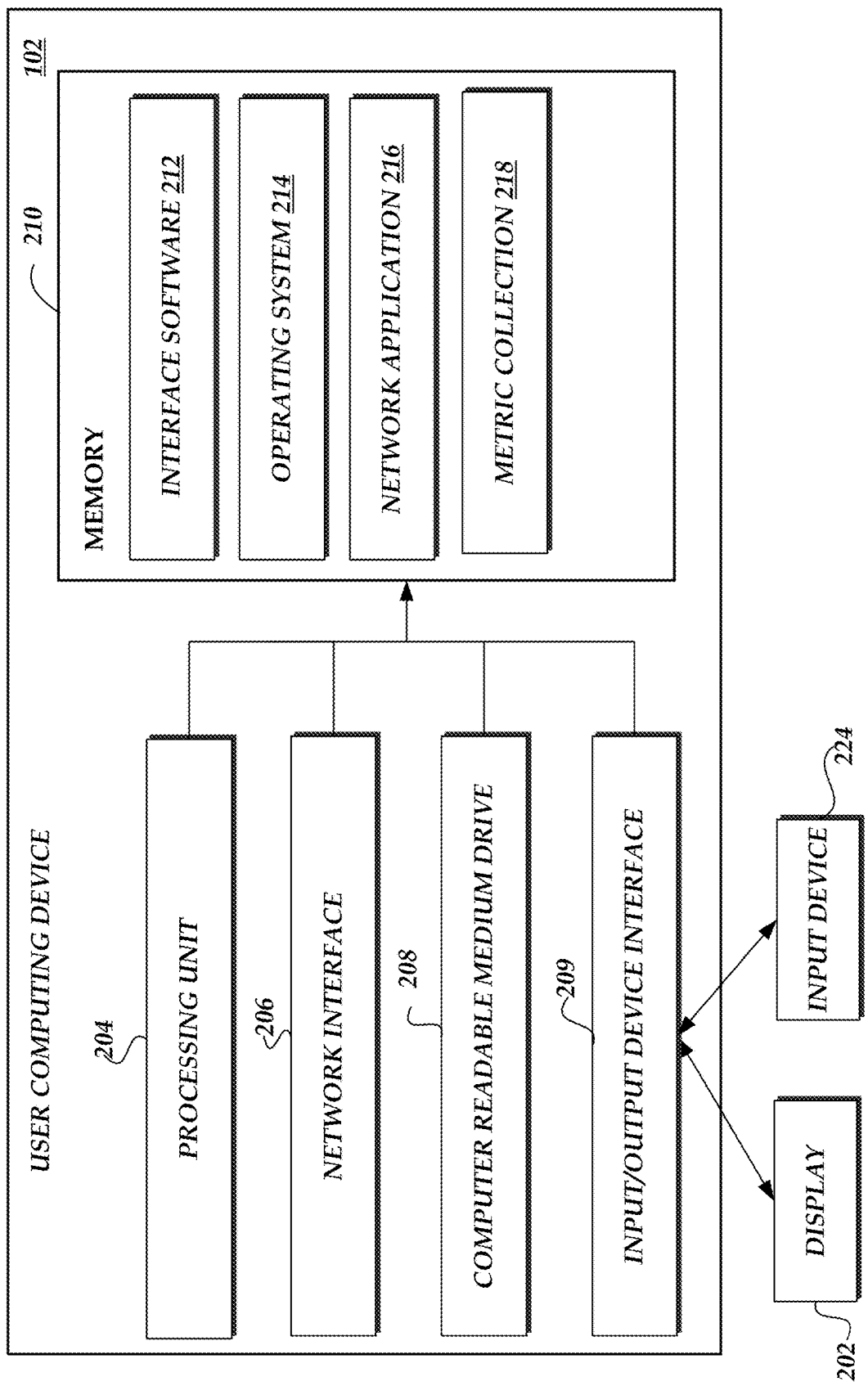
FIG. 2 is a block diagram of illustrative components of a client computing device configured to remotely process content in accordance with an illustrative embodiment.

FIG. 2 depicts one embodiment of an architecture of an illustrative user computing device 102 that can generate content requests and process metric information in accordance with the present application. The general architecture of the user computing device 102 depicted in FIG. 2 includes an arrangement of computer hardware and software components that may be used to implement aspects of the present disclosure. As illustrated, the user computing device 104 includes a processing unit 204, a network interface 206, a computer readable medium drive 207, an input/output device interface 220, an optional display 202, and an input device 224, all of which may communicate with one another by way of a communication bus.

The network interface 206 may provide connectivity to one or more networks or computing systems, such as the network 140 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc. In some embodiments, the user computing device 104 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 104. The memory 210 may further include computer program instructions and other information for implementing aspects of the present disclosure. For example, in one embodiment, the memory 210 includes a network application 216, such as browser application or media player, for accessing content and communicating with and processing metric information with the job management system 110. In other embodiments, the memory 210 may include a separate metric collection processing application 218.

Figure 3:
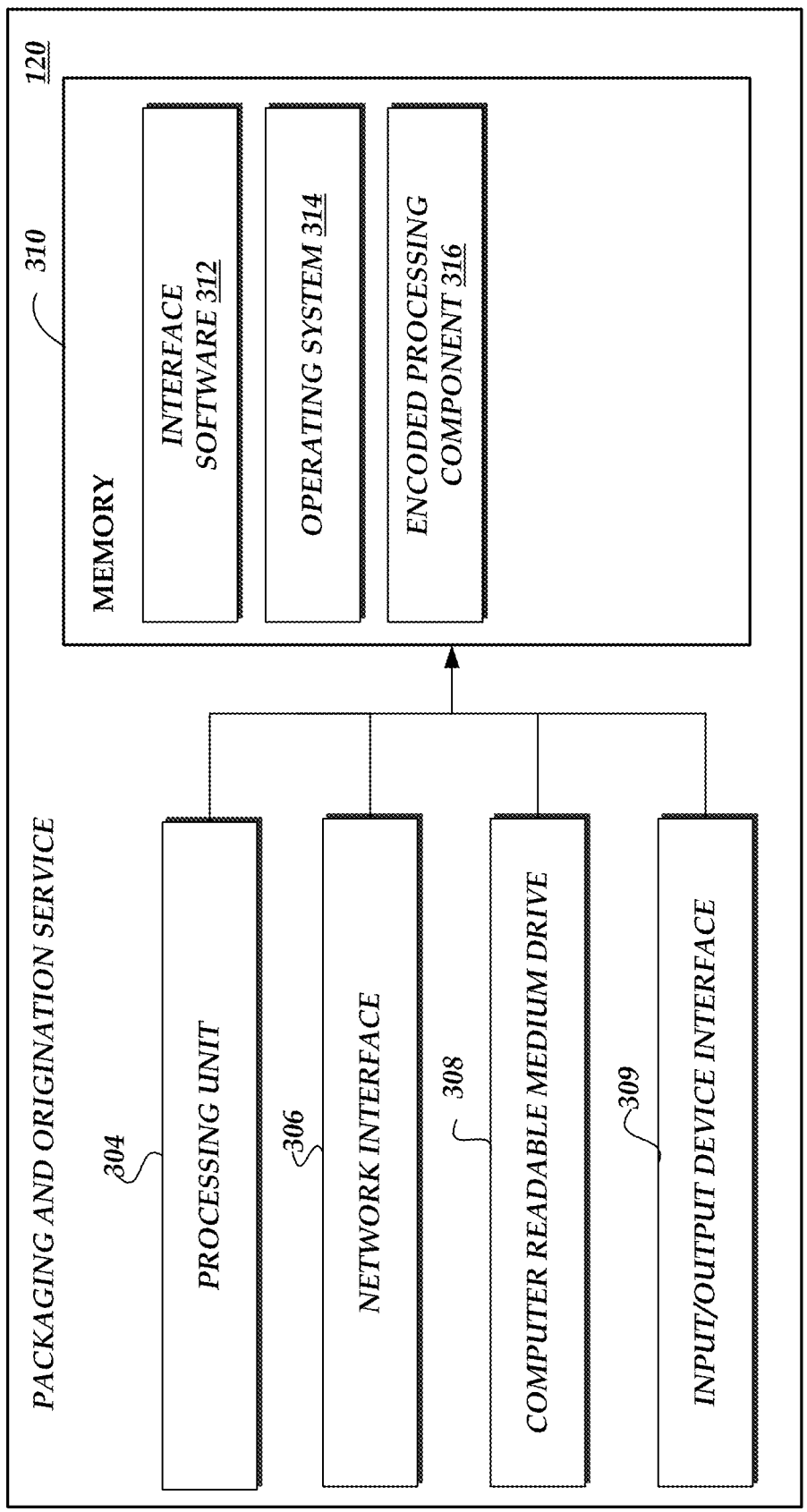
FIG. 3 is a block diagram of illustrative components of a packaging and origination service configured to content manifest for implementation in client devices in accordance with an illustrative embodiment.

FIG. 3 depicts one embodiment of an architecture of an illustrative server for implementing the video packaging and origination service 120 described herein. The general architecture of the video packaging and origination service 120 depicted in FIG. 3 includes an arrangement of computer hardware and software components that may be used to implement aspects of the present disclosure. As illustrated, the video packaging and origination service 120 includes a processing unit 304, a network interface 306, a computer readable medium drive 308, an input/output device interface 309, all of which may communicate with one another by way of a communication bus. The components of the video packaging and origination service 120 may be physical hardware components or implemented in a virtualized environment.

The network interface 306 may provide connectivity to one or more networks or computing systems, such as the network 150 or network 160 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the video packaging and origination service 120 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the video packaging and origination service 120. The memory 310 may further include computer program instructions and other information for implementing aspects of the present disclosure. For example, in one embodiment, the memory 310 includes interface software 312 for receiving and processing content requests from user devices 102. As will be described in detail below, the resulting information can include a dynamically configured bundle to encoding bitrates. Additionally, the memory 310 includes a content processing component 316 for processing content segment efficiency matrix information and dynamically managing encoding bitrate bundles.

Figure 4A:
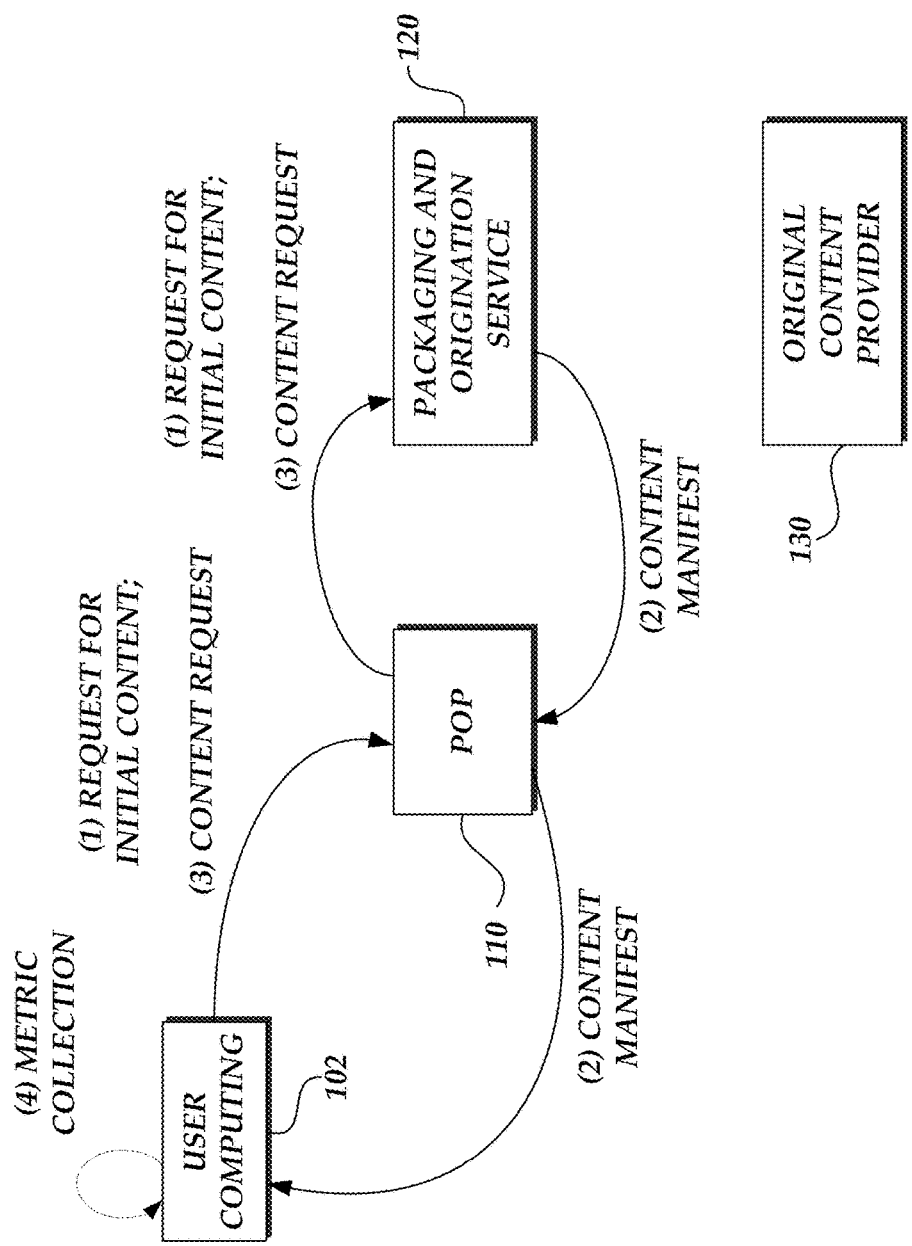
FIGS. 4A-4C are block diagrams of the content delivery environment of FIG. 1 illustrating the interaction related to user device for generating content requests.
Figure 4B:
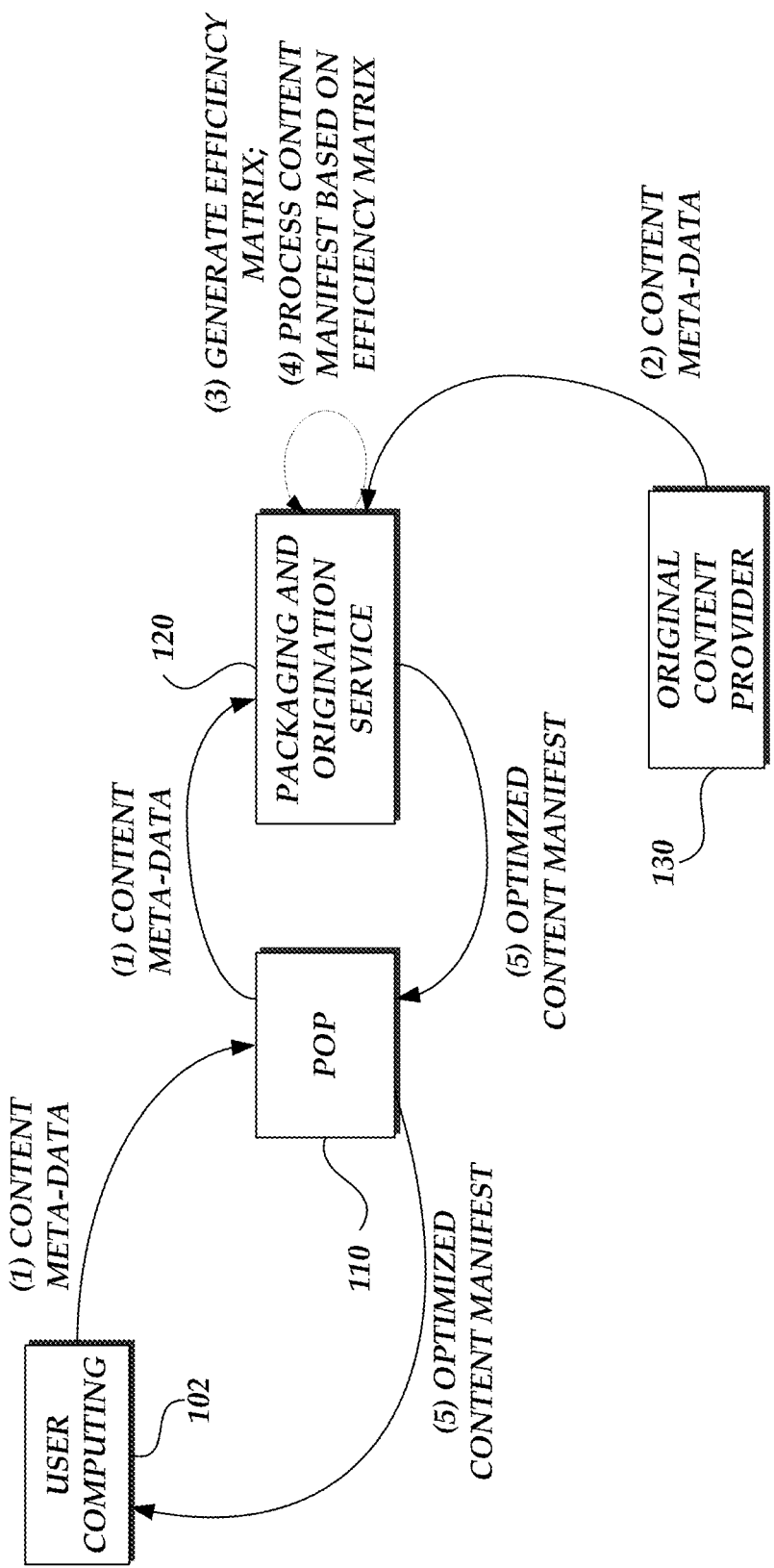

Turning now to FIGS. 4A and 4B, an illustrative interaction for the processing of content requests will be described. At (1), the user device 102 transmits a request for content. Illustratively, a user can access one or more software applications on the user device to request content, such as streaming content. For example, the user device can generate an interface for receiving user commands or interactions and transmit the request. The initial content request may be transmitted directly to the video packaging and origination service 120 and then sent to a selected content delivery network POP 110. Alternatively, the initial content request may be routed, such as via DNS routing or HTTP-based routing, to a POP 110.

In response, at (2), the video packaging and origination service 120 provides a content manifest that identifies a listing of available encoding bitrates or bitrate/format combinations for a first segment of the requested content. Illustratively, the listing of available encoding bitrates or bitrate/format combinations includes sufficient information that allows the user computing device 102 to process the information and select an encoding bitrate for the request. At (3), the user computing device 102 transmits the request for the segment of video at a selected encoding bitrate, or bitrate/format combination. The video packaging and origination service 120 receives the request and transmits the requested segment to the user computing device. For purposes of the present application, the process of selecting and requesting segments according to an encoding bitrate or bitrate/format combinations by the user computing device 102 and transmitting the requested bitrate can be repeated a number of times. Such a repetitive process would be indicative of a sequential transmission of segments for streaming content.

At (4), for each iteration of the request, the user computing device 102 collects metric information regarding the processing of the segment requests. As previously described, the collected metric information can include a throughput or number of segments were received over a defined period of time (e.g., x seconds), the bitrate and encoding format for each received segment, error rates or re-request rates, bitrates that were identified in a bundle/manifest but not requested, bitrate/format combinations that were identified but not requested, and the like.

With reference to FIG. 4B, at (1), the video packaging and origination service 120 receives meta-data including the collected metric information from the user device 102. At (2), the video packaging and origination service 120 receives additional meta-data from the content provider 130. For purposes of the present application, the meta-data can generally refer to various information that can be utilized by the video packing and origination service 120 as described herein. Illustratively, the video packaging and origination service 120 can receive information characterizing aspects of requested content, such as by a quality characterization. The video packaging and origination service 120 can further receive business rules or logic that facilitate the selection of available encoding bitrates or for selecting a specific encoding bitrate based on a received request. The business rules or logic may be specific to individual content, types of content or may be generally applicable to all content. The business rules or logic may also unique to content providers.

At (3), the video packaging and origination service 120 processes the meta-data to generate an efficiency matrix or update a generated efficiency matrix. As previously described, the efficiency matrix that correlates the received metric information in the meta-data with the different encoding bitrates. At (4), the video packaging and origination service 120 processes the content request according to the efficiency matrix. Illustratively, the content streaming system can utilize the efficiency matrix to log metrics about individual encoding bitrates or bitrate/format combinations.

For individual client computing devices or sets of client computing devices, the content streaming system can then identify various trends or characteristics related to the currently offered bundle of encoding bitrates. For example, processing the content request can include the video packaging and origination service 120 identifying encoding bitrates or bitrate/format combinations that have not been requested or in which the number of requests fall below a minimum threshold. In this embodiment, the video packaging and origination service 120 may associated all the requests by encoding bitrate regardless of encoding format or consider each bitrate/format combination individual or in subgroups. Additionally, processing the content request can also include the video packaging and origination service 120 identifying opportunities for additional encoding bitrates or bitrate/format combinations by identifying encoding bitrates or bitrate/format combinations that have been requested a number of times above the minimum threshold and determining whether additional encoding bitrates between the identified encoding bitrates are possible and available. At (5), the video packaging and origination service 120 transmits the optimized manifest or encoding bitrate bundle that is made available to the client computing device for subsequent segment requests. In some embodiments, the video packaging and origination service 120 may generate a master set of available encoding bitrates and allow the POP 110 to select a reduced set of encoding bitrates.

Figure 4C:
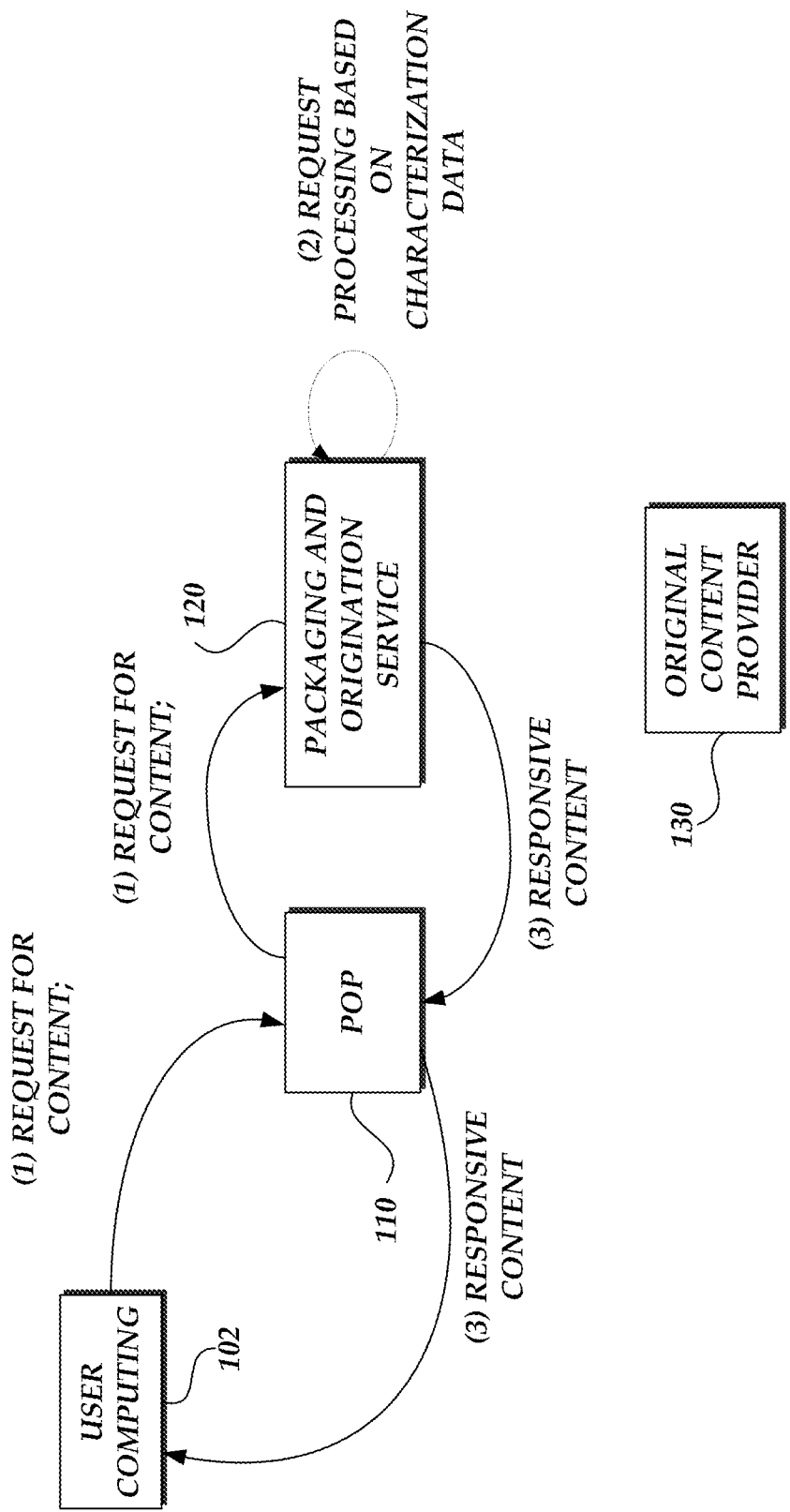

With reference now to FIG. 4C, in an alternative embodiment, the video packaging and origination service 120 can utilize the characterization of content and business logic to modify content requests. At (1), the user computing device 102 transmits a request for a segment of video at a selected encoding bitrate or bitrate/format combination. At (2), the video packaging and origination service 120 receives the request and accesses the content characterization data and business logic. At (3), the video packaging and origination service 120 modifies the selection of encoded bitrate or bitrate/format combination based on the evaluation of the business logic. Illustratively, the characterization of the content can correspond to a determination of quality of transmission. For example, a higher quality content characterization may require a minimal encoding bitrate relative to lower quality content characterizations. Accordingly, the video packaging and origination service 120 can evaluate business logic to ensure that a requested encoded bitrate meets the minimal encoding bitrate or to adjust a requested bitrate to a higher bitrate based on the business logic. At (4), the video packaging and origination service 120 receives the request and transmits the requested segment to the user computing device 102.

Turning now to FIG. 5, a routine 500 for processing content requests will be described. Illustratively, routine 500 will be described with regard to implementation by the video packaging and origination service 120. For purposes of routine 500, it is assumed that the video packaging and origination service 120 has previously obtained and provided a content manifest and content segment to one or more user devices 102. At block 502, the video packaging and origination service 120 receives meta-data including the collected metric information from the user device 102. At block 504, the video packaging and origination service 120 receives additional meta-data from the content provider 130. Illustratively, the video packaging and origination service 120 can receive information characterizing aspects of requested content, such as by a quality characterization. The video packaging and origination service 120 can further receive business rules or logic that facilitate the selection of available encoding bitrates or for selecting a specific encoding bitrate based on a received request. The business rules or logic may be specific to individual content, types of content or may be generally applicable to all content. The business rules or logic may also unique to content providers.

At block 506, the video packaging and origination service 120 processes the meta-data to generate an efficiency matrix or update a generated efficiency matrix. As previously described, the efficiency matrix correlates the received metric information in the meta-data with the different encoding bitrates or bitrate/format combinations. In some embodiments, the efficiency matrix can correspond to all requests for a defined set of content. In other embodiments, the efficiency matrix can be based on different quality versions of the requested content. For example, the video packaging and origination service 120 may maintain or access different efficiency matrices based on the characterization of quality.

At block 508, the video packaging and origination service 120 processes the content request according to the efficiency matrix. Illustratively, the content streaming system can utilize the efficiency matrix to log metrics about individual encoding bitrates. For individual client computing devices or sets of client computing devices, the content streaming system can then identify various trends or characteristics related to the currently offered bundle of encoding bitrates or bitrate/format combinations. For example, processing the content request can include the video packaging and origination service 120 identifying encoding bitrates or bitrate/format combinations that have not been requested or in which the number of requests fall below a minimum threshold. Additionally, processing the content request can also include the video packaging and origination service 120 identifying opportunities for additional encoding bitrates or bitrate/format combinations by identifying encoding bitrates or bitrate/format combinations that have been requested a number of times above the minimum threshold and determining whether additional encoding bitrates between the identified encoding bitrates are possible and available.

At block 510, the video packaging and origination service 120 transmits the optimized the manifest or encoding bitrate bundle that is made available to the client computing device for subsequent segment requests. In some embodiments, the video packaging and origination service 120 may generate a master set of available encoding bitrates and allow the POP 110 to select a reduced set of encoding bitrates.

Turning now to FIG. 6, a routine 600 for processing content requests will be described. Illustratively, routine 600 will be described with regard to implementation by the video packaging and origination service 120. At block 602, the video packaging and origination service 120 receives a request for a segment of video at a selected encoding bitrate or bitrate/format combination. At block 604, the video packaging and origination service 120 receives the request and accesses the content characterization data and business logic. Illustratively, the business logic can provide various rules for identifying how content segment requests should be processed based on characterization of the requested segment. For example, the business logic can identify minimum ranges of encoding bitrates that are required based on a characterization of quality. In this example, a higher quality characterization would likely result in minimum ranges. In another example, the business logic can identify maximum ranges of encoding bitrates that cannot be exceeded based on a characterization of quality. In this example, a lower quality characterization would likely result in maximum ranges. In still further examples the business logic can correspond to logic or rules that cause the video packaging and origination service 120 to request higher or lower encoding bitrates than originally requested or to replace a requested encoding bitrate with an encoding bitrate selected from an available range of encoding bitrate. In yet another example, the business logic can correspond to logic or rules that cause the video packaging and origination service 120 to request a next higher or lower encoding bitrates than originally requested encoding bitrate. The business logic can correspond to logic or rules that cause the video packaging and origination service 120 to request different bitrate/format combinations based on the characterization data.

At block 606, the video packaging and origination service 120 modifies the selected encoded bitrate or bitrate/format combinations based on the evaluation of the business logic. Illustratively, the characterization of the content can correspond to a determination of quality of transmission. For example, a higher quality content characterization may require a minimal encoding bitrate relative to lower quality content characterizations. Accordingly, the video packaging and origination service 120 can evaluate business logic to ensure that a requested encoded bitrate or bitrate/format combinations meet the minimal encoding bitrate or to adjust a requested bitrate to a higher bitrate based on the business logic. At block 608, the video packaging and origination service 120 transmits the requested segment to the user computing device 102. The routine 600 terminates at block 608.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for managing the transmission of content for streaming to client devices, wherein the content is organized into a plurality of segments, the system comprising:
    one or more computing devices configured to receive streaming content requests from individual user devices and meta-data from a set of user devices corresponding to historical transmission of at least one segment of requested video streaming content; and
    one or more computing devices associated with a video packaging and origination service, wherein the video packaging and origination service is configured to:
        access a content delivery manifest that provides a listing of a set available encoding bitrates for a requested segment corresponding to a received request for streaming content;
        process the meta-data to generate an efficiency matrix, the efficiency matrix correlating the received meta-data according specific encoding bitrates identified in the content delivery manifest;
        update the content delivery manifest to modify at least one aspect of the content delivery manifest based on the efficiency matrix, wherein updating the content delivery manifest includes at least one of adding or removing a listing of an available encoding bitrate in the content delivery manifest;
        transmit the updated content delivery manifest responsive to the received request for streaming content;
        obtain a subsequent request for a segment;
        process the subsequent request for a segment according to quality characterization information to select an encoding bitrate for the requested segment; and
        transmit a responsive segment corresponding to the selected encoding bitrate based on the processed subsequent request.

2. The system of Claim 1, wherein the video packaging and origination service updates the content delivery manifest to remove at least one encoded bitrate in the set of encoded bitrates based on information associated with the at least one encoded bitrate.

3. The system of Claim 1, wherein the video packaging and origination service updates the content delivery manifest to add at least one encoded bitrate in the set of encoded bitrates based on information associated with at least one additional encoded bitrate.

4. The system of Claim 1, wherein the video packaging and origination service processes the subsequent request for a segment according to quality characterization information to select an encoding bitrate for the requested segment by selecting a higher encoded bitrate in a defined range based on a higher quality characterization.

5. A computer-implemented method for managing of the transmission of content to computing devices comprising: receiving a request for streaming content, the streaming content organized according to a set of segments; obtaining a content delivery manifest listing a set of encoded bitrates for the set of segments associated with request for streaming content; processing the content delivery manifest according to a historical processing of segments, wherein processing the content delivery manifest according to the historical processing of segments includes generating a superset of available encoded bitrates and filtering the superset of available encoded bitrates based on characteristics of a content request; and causing a transmission of the processed content delivery manifest.

6. The computer-implemented method of Claim 5, wherein processing the content delivery manifest according to the historical processing of segments includes identifying requests for at least one encoded bitrate in the set of encoded bitrates that do not exceed a minimum threshold.

7. The computer-implemented method of Claim 6, wherein processing the content delivery manifest according to the historical processing of segments includes removing the identified encoded bitrates identified as not exceeding the minimum threshold.

8. The computer-implemented method of Claim 5, wherein processing the content delivery manifest according to the historical processing of segments includes identifying requests for at least one encoded bitrate in the set of encoded bitrates that exceed a minimum threshold.

9. The computer-implemented method of Claim 8, wherein processing the content delivery manifest according to the historical processing of segments includes: identifying at least one additional encoding bitrate based on the encoded bitrates identified as exceeding the minimum threshold; and adding the identified at least one additional encoding bitrate to the content delivery manifest.

10. A computer-implemented method for managing of the transmission of content to computing devices comprising: receiving a request for streaming content, the streaming content organized according to a set of segments; obtaining a content delivery manifest listing a set of encoded bitrates for the set of segments associated with request for streaming content; processing the content delivery manifest according to historical processing of segments organized according to a characterization of the delivery of the content; and causing the transmission of the processed content delivery manifest.

11. The computer-implemented method of Claim 10, wherein the characterization of the delivery of the content corresponds to a characterization of quality.

12. The computer-implemented method of Claim 10 further comprising:
    obtaining a subsequent request for a segment, the request identifying a requested encoding bitrate;
    processing the subsequent request for a segment according to the characterization of the delivery of the content by selecting an encoding bitrate different from a requested encoding bitrate; and transmit a responsive segment corresponding to the selected encoding bitrate.

13. The computer-implemented method of Claim 12, wherein selecting an encoding bitrate different from a requested encoding bitrate includes selecting a higher encoded bitrate within a defined range of encoded bitrates based the characterization of the delivery of the content.

14. The computer-implemented method of Claim 12, selecting an encoding bitrate different from a requested encoding bitrate includes selecting a lowest encoded bitrate within a defined range of encoded bitrates based the characterization of the delivery of the content.

15. A computer-implemented method for delivering content comprising: receiving a request for streaming content, the streaming content organized according to a set of segments; processing an identified set of available segments associated with the request for streaming content according to a historical processing of segments, wherein the segments are identified by a format and an encoding bitrate and wherein processing the identified set of available segments associated with the request for streaming content according to the historical processing of segments includes processing an identified set of available encoding bitrates based on a characterization of the delivery of the content; and causing a transmission of the processed identified set of available encoding bitrates.

16. The computer-implemented method of Claim 15 wherein processing the identified set of segments associated with the request for streaming content according to the historical processing of segments includes identifying a number of historical requests for the identified set of available segments.

17. The computer-implemented method of Claim 16, wherein processing the identified set of available segments associated with the request for streaming content according to the historical processing of segments includes at least one of adding or removing at least one available segment.

18. The computer-implemented method of Claim 15, wherein processing the set of available encoding bitrate based on the characterization of the delivery of the content includes selecting an encoding bitrate based on the processing the set of available encoding bitrate based on the characterization of the delivery of the content.

* * * * *